(12) United States Patent
Schmaltz et al.

(10) Patent No.: US 6,643,878 B2
(45) Date of Patent: Nov. 11, 2003

(54) LOADING RAMP DEVICE WHICH ROLLS UP FOR CONVENIENT STORAGE

(75) Inventors: Don Schmaltz, Fargo, ND (US); Joe Stanislao, Bozeman, MT (US); Thomas E. Kenville, Fargo, ND (US)

(73) Assignee: DT&J, Inc., West Fargo, ND (US)

( * ) Notice: Subject to any disclaimer, the term of this patent is extended or adjusted under 35 U.S.C. 154(b) by 0 days.

(21) Appl. No.: 10/112,596

(22) Filed: Mar. 27, 2002

(65) Prior Publication Data

US 2003/0182740 A1 Oct. 2, 2003

(51) Int. Cl.[7] .............................................. E01D 1/00
(52) U.S. Cl. .......................................... 14/69.5; 414/921
(58) Field of Search ............................ 14/69.5; D34/32; 414/537, 921; 119/849; 254/88

(56) References Cited

U.S. PATENT DOCUMENTS

| 277,222 | A | 5/1883 | Bush |
| 288,455 | A | 11/1883 | Landes |
| 3,139,949 | A | 7/1964 | Graves .......................... 182/36 |
| 3,397,546 | A | 8/1968 | Eisert et al. .................... 61/48 |
| 3,580,404 | A | 5/1971 | Moser .......................... 214/85 |
| 3,818,528 | A | 6/1974 | Petersen ......................... 14/72 |
| 3,984,891 | A | 10/1976 | Weinmann ................... 14/69.5 |
| 4,613,013 | A | 9/1986 | Watling ........................ 182/20 |
| 4,864,672 | A | 9/1989 | Altieri et al. ................. 14/69.5 |
| 4,864,673 | A | 9/1989 | Adaway et al. ............... 14/71.1 |
| 4,944,546 | A | 7/1990 | Keller .......................... 296/61 |
| 5,062,174 | A | 11/1991 | DaSalvo ...................... 14/69.5 |
| 5,287,579 | A | 2/1994 | Estevez, Jr ................... 14/71.1 |
| 5,325,558 | A | 7/1994 | Labreche ..................... 14/69.5 |
| 5,347,672 | A | 9/1994 | Everard et al. ............... 14/69.5 |
| 5,400,733 | A | 3/1995 | Richter ........................ 114/258 |
| 5,440,773 | A | 8/1995 | Lentini ....................... 14/69.5 |
| 5,634,228 | A | 6/1997 | Johnston ..................... 14/69.5 |
| 5,791,717 | A | 8/1998 | Reich et al. .................. 296/61 |
| 6,139,249 | A | 10/2000 | Lucht .......................... 414/537 |
| 6,378,927 | B1 * | 4/2002 | Parry-Jones et al. .......... 296/61 |
| 6,447,040 | B1 * | 9/2002 | Young, Sr. ................... 296/61 |

* cited by examiner

Primary Examiner—Gary S. Hartmann
(74) Attorney, Agent, or Firm—Curtis Harr

(57) ABSTRACT

A loading ramp structure is provided which is constructed out of a plurality of relatively small and rectangular links that are joined end to end to form a span of any desired length. The manner in which these links are joined together allows the span to be rolled up for storage when it is not in use and to be unrolled to form a ridged span when it is to be employed in the loading or unloading of wheeled load materials such as small supplementary vehicles.

18 Claims, 14 Drawing Sheets

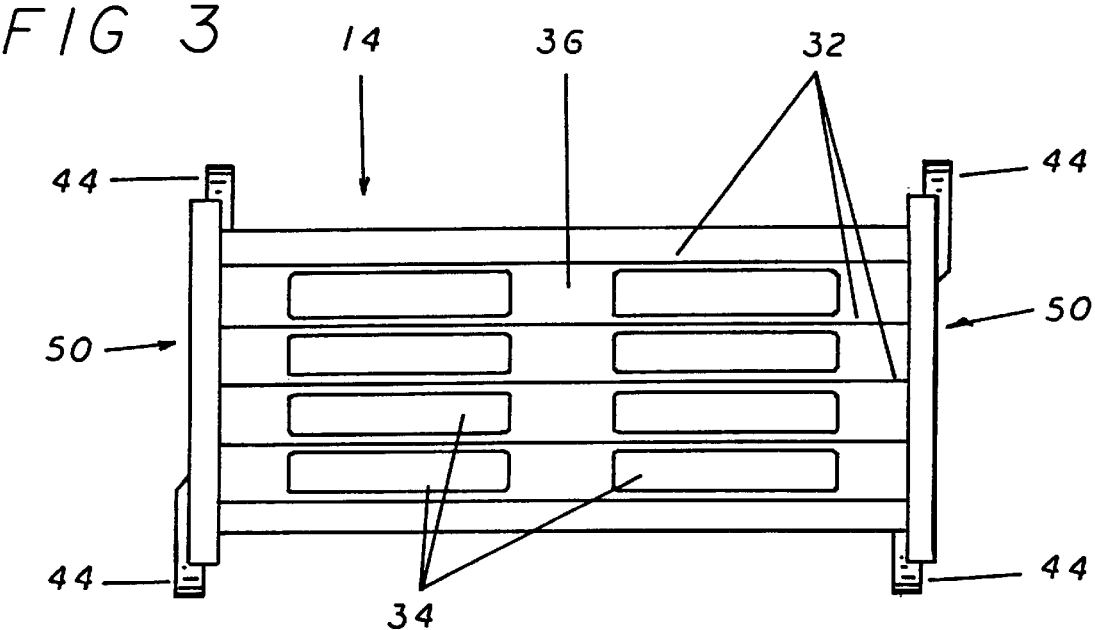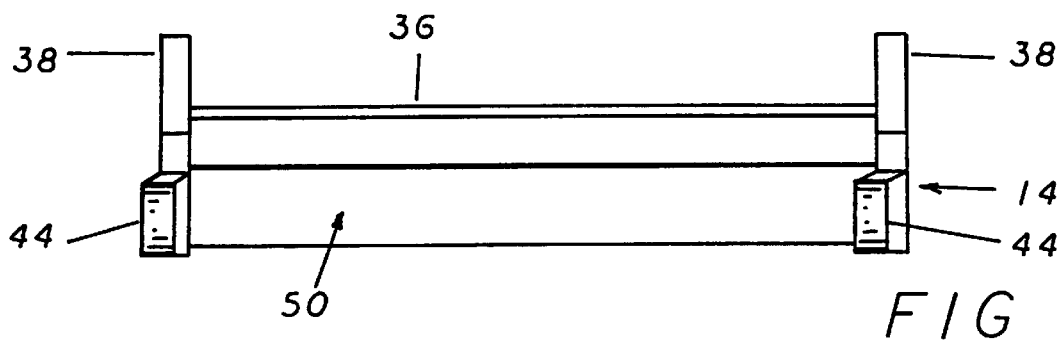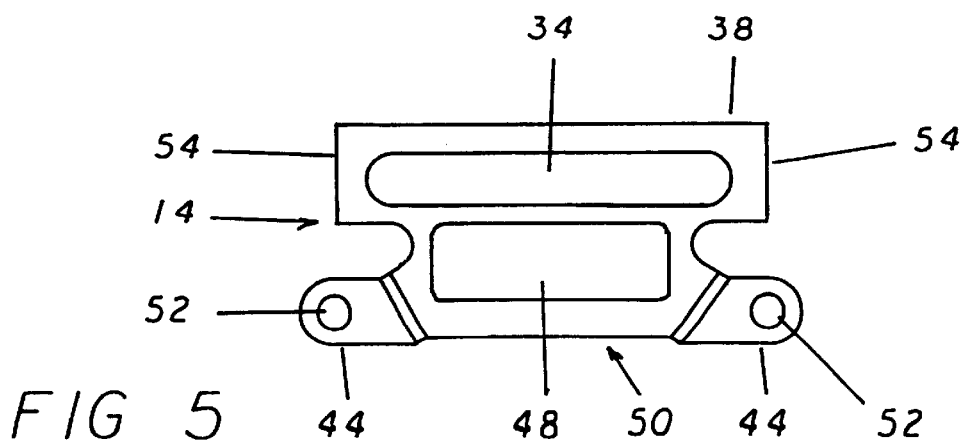

FIG 24
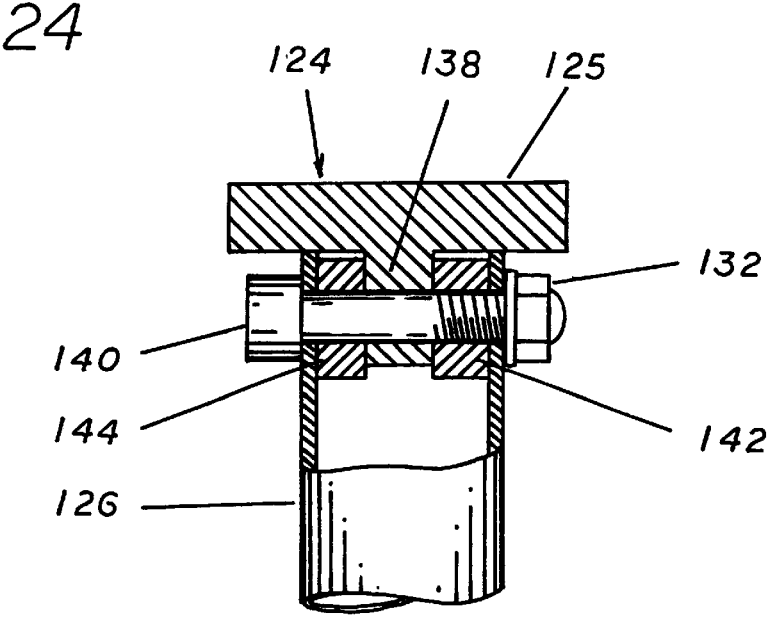
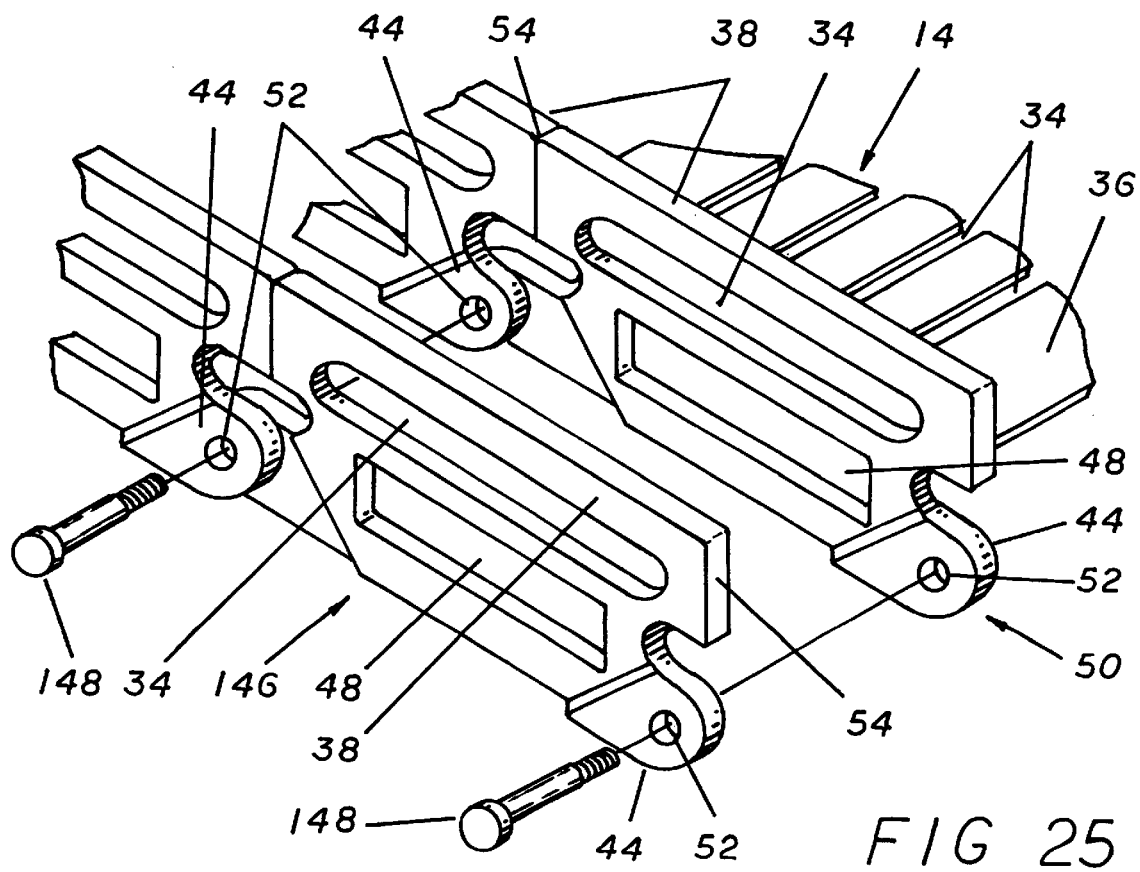
FIG 25

LOADING RAMP DEVICE WHICH ROLLS UP FOR CONVENIENT STORAGE

BACKGROUND OF THE INVENTION

The present invention relates to the field of loading ramps and, more specifically, to loading ramps and the like which may be rolled up for convenient storage and transport.

Loading ramps of many types have been known and are commonly used to unload pick-up trucks, delivery trucks and the like. Further, these ramps may be used to allow wheeled vehicles to traverse short sets of steps. As these ramps are often used with mobile vehicles, it is desirable that the ramps be highly portable and storable. As such, several varieties of folding ramps are known. Typically, these ramps may fold in a rectangular or square fashion and pile on top of each other. As these ramps may be used to unload very heavy loads, considerable strength may be necessary when designing and using these ramps. The strength necessary along with the desirability of making a ramp easily portable has created a problem in that ramps which are easily portable may often be light and lack the requisite strength needed, whereas ramps of a sufficient amount of strength to move heavier loads may be large and bulky.

It is therefore an object of the present invention to provide a ramp which may be rolled for easy and convenient storage which is both light and easy to use while still having the requisite strength needed for a given job. Further, it is desirable that this ramp be easy to use and contain other features lending to the utility of the present invention.

SUMMARY OF THE INVENTION

It is the primary objective of the present invention to provide a method by which wheeled vehicles, such as wheelchairs and utility vehicles (including garden tractors and recreational vehicles), can be easily loaded into the back load carrying portion of larger vehicles such as pickup trucks and cargo or minivans.

It is an additional objective of the present invention to provide such a loading device that can be rolled up for easy and compact storage when the device is not in use and which is constructed in a manner and of a material that makes it light weight enough for almost all individuals of a large variety of physical capabilities.

It is a further objective of the present invention to provide such a loading device that, when in its unrolled and deployed orientation, is strong enough to easily support the weight of the vehicles and their occupants that are typically loaded and transported in this manner.

It is a still further objective of the present invention to provide such a loading device that is relatively simple and inexpensive in its design and construction which allows it to be used by average people without the need for specialized tools or knowledge.

These objectives are accomplished by the use of a series of interlocking rectangular metallic or non-metallic links that are pivotally attached to one another at both of their longer sides. By attaching enough of these links together in this fashion, a bridge-like structure is created that can be used to span the gap between the surface upon which a supplemental vehicle rests and the load bed of a transporting vehicle such as a pickup truck or van. This loading process is accomplished by placing one or more of these structures, depending upon the number and orientation of the wheels on the supplemental vehicle, between the vehicle bed and ground or surface upon which the supplemental vehicle rests, and then driving or pushing the supplemental vehicle up the ramp and into the transport vehicle. The unloading of the supplemental vehicle is accomplished simply by reversing this process.

Once the loading or unloading is accomplished, the design of the present invention allows it to be rolled up into a compact cylindrical form that can be easily stored in a relatively small area or volume. The individual links of the present invention are specifically designed in a manner that allows for this rolling and unrolling process and also allows the ramp to be extended out and employed to span relatively large distances and support a great deal of weight without the use of additional support structures. These attributes of the invention are accomplished by the manner of construction of the surfaces of the individual links where they are joined to one another and by the method used to make the connections of the links.

Each individual link has on its forward and rearward facing surfaces extending tab-like features which are hemispherically shaped and each laterally offset in a manner that allows them to be mated to corresponding tabs on other links. Each of the tabs also contain a cylindrical hole that passes laterally through it just behind the hemispherically shaped leading edge and which correspond in location to other such holes when the tabs are mated during the link joining process. Therefore, when a plurality of links are placed end to end, the offset tabs of one slide next to the tabs of its neighbor to the point where their centrally located holes align. The connection of the two links is completed by passing a pressure fitted pin through this hole which defines a pivotal axis between the links. This design allows each of the individual links to pivot in relation to one another around this axis. This pivoting motion is the aspect of the present invention which allows it to be rolled up for storage purposes.

The individual links of the invention are also designed to halt the pivoting motion at the proper point as to form the bridge-like span which is central to its purpose. This is accomplished by the design of the vertically oriented link contact surfaces of the links that make up the span. These link contact surfaces are formed so that they are oriented at nearly right angles (they are actually slightly inwardly oriented in relation to the body of the link) to the other surfaces of the link. The major importance of the design of the link contact surfaces is the manner in which they interact with the link contact surfaces of their neighboring links in the span of the invention. It is this interaction of two link contact surfaces which provides load bearing functions of the invention as the slight angle of their construction imparts a slight upward bow or cumber to the span of the invention when it is fully deployed which adds strength to the span. Additionally, the relationship between the location of the pivot point (at the lower surface of the links) and these link contact surfaces (at the upper surface of the links) focuses the load carried by the invention on to the link contact surfaces.

The individual links are also designed with an upper surface which has both raised ridges for improved traction and plurality of areas where material has been removed for weight reduction purposes. These features provide a ramp that is safe for people of all abilities to operate and one that can be easily handled and transported because of its overall light weight while maintaining the structural rigidity necessary to carry the loads it was designed for.

An optional hinging mechanism is also provided that allows the present invention to be stored in a folded orientation rather than the rolled manner as described above. The need for this optional hinging mechanism is that the design of the primary pivot tabs limits their inward travel. That is to say, when pivoting the individual links towards each other, the direct liking of the pivot tabs prohibits the neighboring links from completely folding to a parallel orientation with respect to one another. While this design allows the invention to be completely and easily rolled for storage, it does not allow it to be folded into two shorter and parallel spans for transport and storage purposes.

To facilitate this folding function, an alternative pivoting link may be obtained which allows the user to create a 180° fold in the ramp span. The 180° hinge allows for this folding function by moving the pivot point between two neighboring links from the single pivot point between the pivot tabs located at the lowest and outside points of each link, to two pivot points located on the center line of each link in a position removed from the outside edge of the links which are then spanned by a pivoting bracket. The use of the double pivot points to join two neighboring links allows those links to be folded in a completely parallel manner which in turn allows the span of the present invention to be folded into two equal halves. This allows the invention to be stored in this folded manner when space is not such a significant issue. Additionally, this method of storage allows the invention to be deployed and stored more quickly which enhances its overall utility.

Additionally, the present invention can also be fitted with a powered winch-like device which can be employed by a user to pull a wheelchair (or other wheeled vehicle) and its occupant up the incline of the ramp span. This optional device is useful for those individuals who do not have a powered wheelchair and who are physically impaired to a degree that makes it difficult for them to manually drive the wheelchair up the incline of the invention. Therefore, the use of the powered chair lift assembly provides such individuals with a greater degree of independence as it allows them to gain access to areas that they would otherwise need the assistance of others to enter.

The powered chair lift assembly uses an electric motor to drive a large and small pulley which each have the ends of a braided steel cable attached to them. This cable forms a loop which extends forward around an idler pulley positioned at the end of a bar extension. The idler pulley allows the cable to be directed back over the body of the powered chair lift assembly and down the ramp span to a position where it can be connected to a wheelchair. Once this connection has been established, the user then remotely engages the electric motor which rotates the pulleys which acts to shorten the cable. This shortening of the cable draws the attached wheelchair towards the powered chair lift assembly, thus, pulling the wheelchair and its occupant up the incline of the ramp span.

An additional optional feature is available for use with the present invention which consists of an elevated hand rail that can be fitted to the existing components of the ramp span. The hand rail is made of a relatively broad rail that is positioned at an appropriate height by the use of a plurality of hand rail posts. The hand rail posts are constructed in such a manner so that their lower ends fit over the link rails of the link body in a fashion that allows them to be easily bolted into a upright and ridged position. The upper portion of the hand rail posts are similarly constructed so that they conform to the shape of the lower surface of the hand rail which enables it to be easily attached at this end as well. The use of the hand rail provides an extra degree of safety to those individuals who are able to walk but require the additional stability of a hand support while ascending or descending an inclined surface.

A still further optional feature is available for use with the present invention which uses a double end plate arrangement to increase the load carrying capacity of a deployed ramp span. In this configuration a double end plate is attached to each outer surface of the ramp links. The double end plates are constructed in exactly the same configuration as the outer surfaces of the ramp links and also connect in sequence in the same fashion as the ramp links. The connection between the double end plates and the ramp links is made by removing the pivot bolt holding the joined ramp links together, placing a double ramp link in such a location so that it matches the orientation of the underlying outer surface of the ramp link, and replacing the pivot bolt with a long pivot bolt which passes through the link pivot tabs of both the double ramp link and the underlying ramp link.

Additionally, since the weakest point of a deployed ramp span is located at its center portion, it will only be necessary to add the double end plates to those ramp links located at or near its center to increase its load capacity by as much as a factor of 2. This configuration enhances the usefulness of the ramp span as it greatly increases its carrying capacity without affecting its roll-up capabilities or significantly increasing its overall weight.

For a better understanding of the present invention reference should be made to the drawings and the description in which there are illustrated and described preferred embodiments of the present invention.

DESCRIPTION OF THE DRAWINGS

FIG. 3 is a top elevation view of an individual ramp link component of the present invention detailing its manner of construction and the location and orientation of the link pivot tabs.

FIG. 4 is a front elevation view of an individual ramp link component of the present invention detailing its manner of construction and the location and orientation of the link pivot tabs.

FIG. 5 is a side elevation view of an individual ramp link component of the present invention detailing its manner of construction and the location and orientation of the link pivot tabs.

FIG. 24 is a front elevation cut-away view of the lower mount component of the optional hand rail component of FIG. 20 taken along line 3 and illustrates the method used to attach the upper end of the hand rail post to the hand rail.

FIG. 25 is a perspective view of a still further optional component of the present invention which uses a double end plate arrangement to strengthen the ramp span when unrolled and deployed for use.

DESCRIPTION OF THE PREFERRED EMBODIMENT

Figure 1:
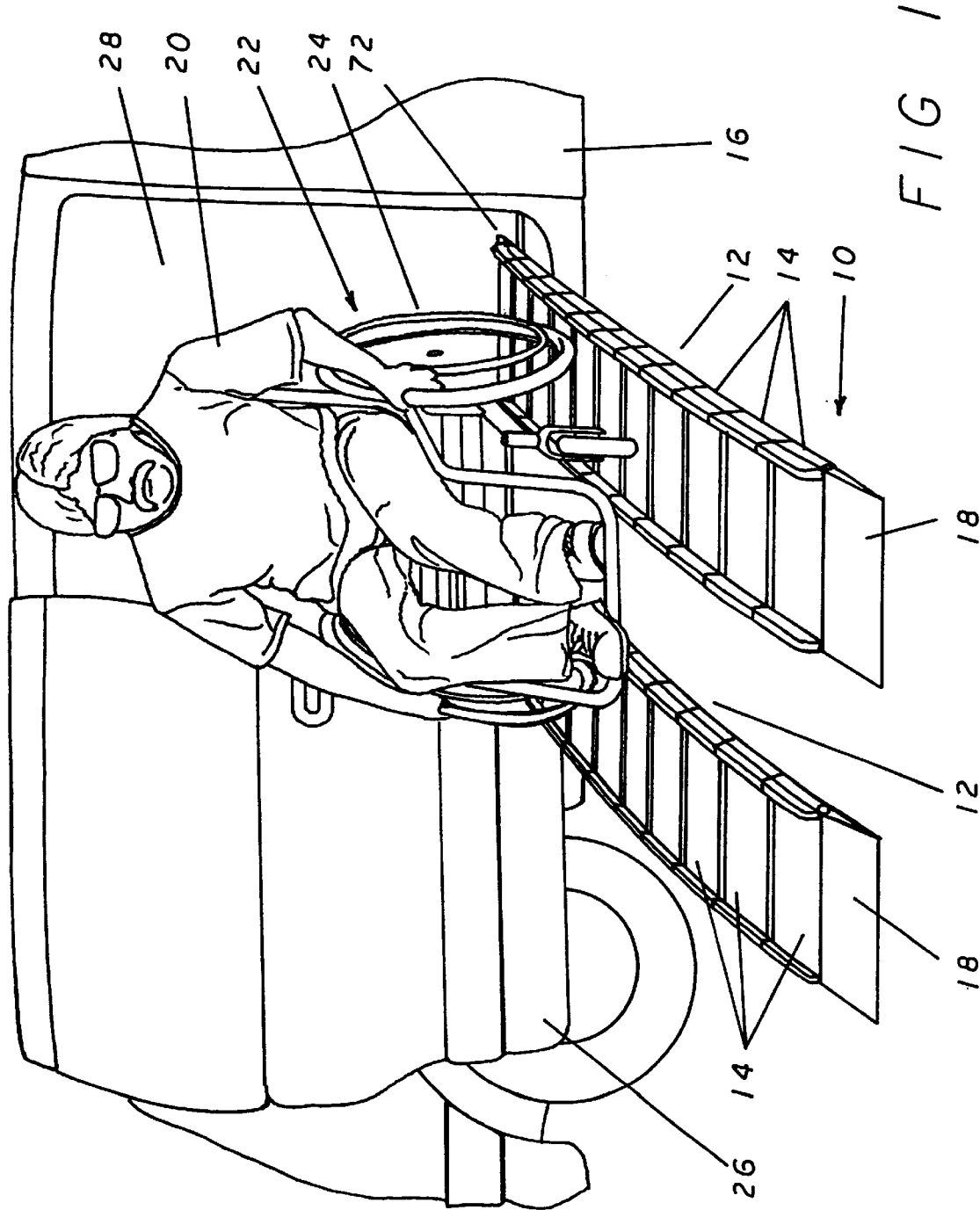
FIG. 1 is a perspective view of the present invention illustrating the manner in which it is employed in conjunction with a minivan and the way a handicapped person employs it to gain access to the van.
Figure 2:
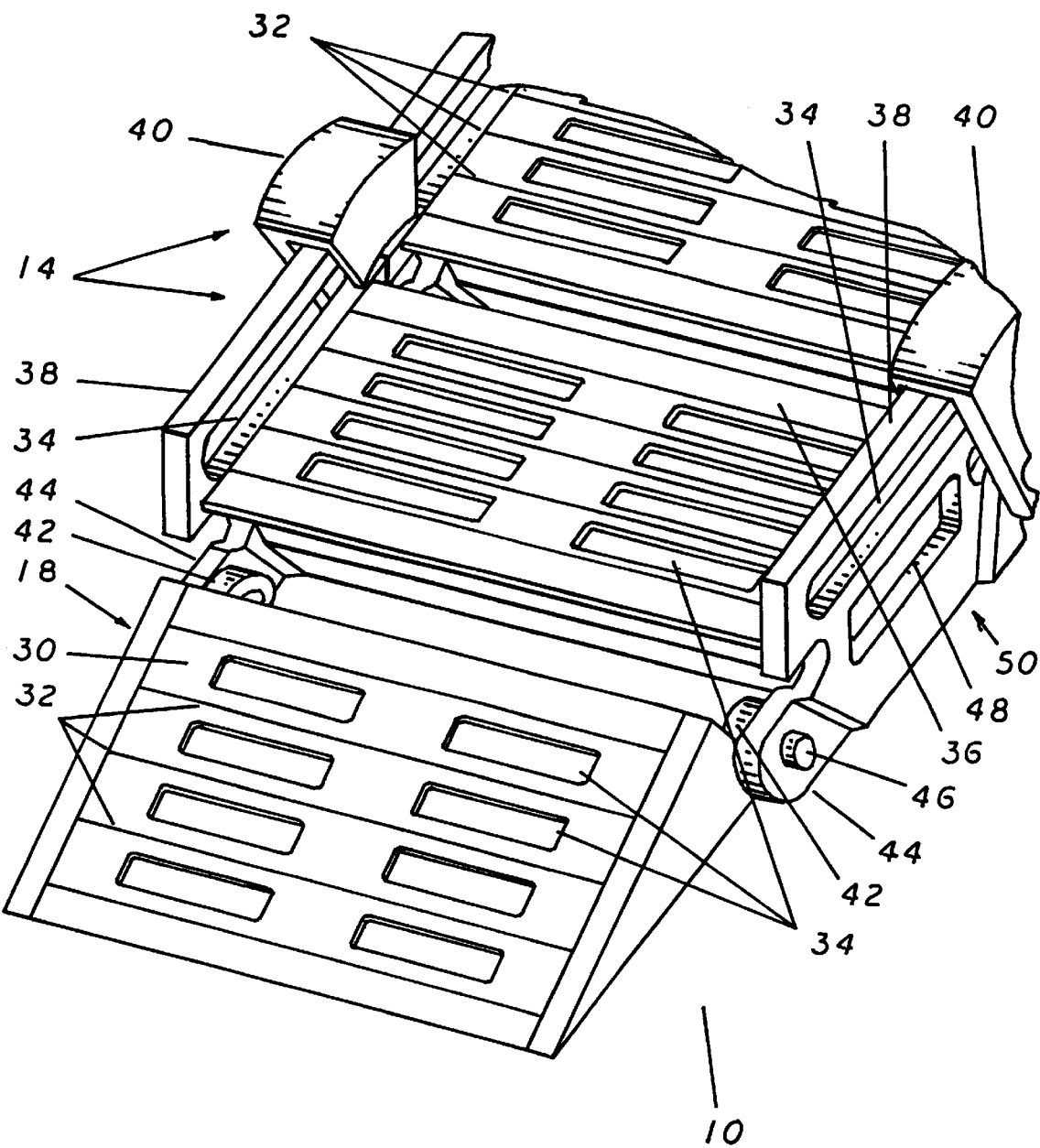
FIG. 2 is a perspective view of the ramp link and foot components of the present invention detailing their manner of construction and the orientation of its major components in relation to one another.

Referring now to the drawings, and more specifically to FIGS. 1 and 2, the roll up loading ramp 10 consists primarily of single or multiple ramp spans 12 which are themselves made up of a plurality of interlocking rectangular metallic ramp links 14. These ramp links 14 are pivotally attached to one another at both of their front and rear longer sides by the use of the link pivot tabs 44 and link pivot pin 46 or the pivot bolt 56 and locking pivot nut 58. In the case of the lower and upper ramp feet, 18 and 72, the connection to the neighboring ramp link 14 is made by joining the foot pivot tab 42 to the corresponding link pivot tab 44. By attaching a predetermined number of these ramp links 14 together by the use of these components, a bridge like ramp span 12 is created that can be used to span the gap between the surface upon which a supplemental vehicle rests and the cargo floor of the illustrated van 16 or other transporting vehicle.

The loading process by use of the present invention is accomplished by placing one or more of these ramp span 12 structures, depending upon the number and orientation of the wheels on the supplemental vehicle, between the floor in the van interior 28 of the illustrated van 16 and the ground. Once this is accomplished, the supplemental vehicle is then loaded or unloaded by driving or pushing the vehicle up the roll-up loading ramp 10 and into, or out of, the van interior 28. Once this is accomplished, the present invention is then simply rolled up and stored in a convenient location until it is needed for loading again.

The securement of the ramp spans 12 between the van's interior 28 and the surface of the ground is accomplished by the use of the upper ramp foot 72 and the lower ramp foot 18. The lower ramp foot 18 is simply a triangular shaped link having a flat side that is used to engage and hold the surface that the supplemental vehicle (in the illustrated case a wheelchair) is being unloaded on. Additionally, the lower ramp foot 18 also contains an angled foot surface 30 which functions to provide a smooth transition from the ground surface to the link surfaces 36 of the individual ramp links 14 that make up the length of the ramp span 12.

The upper end of the ramp span 12 also contains a specialized link which is used to engage the surface of the floor of the van's interior 28. This type of link is known as the upper ramp foot 72 and is often made from a magnetic material which bonds to a metallic surface inside the van's door 26. The upper ramp foot 72 is also triangular in shape with its pointed end oriented in a forward manner in relation to the other ramp links 14 and which is attached to the upper most link in the ramp span 12 in the same manner as the ramp links 14. Like the lower ramp foot 18 described below, the design of the upper ramp foot 72 also serves to smooth the transition from the surface of the ramp span 12 to the interior of the van 16.

With the present invention thus deployed, a user (in the instant case a handicapped individual 20) can direct the wheels 24 of his wheelchair 22 (or any other wheel vehicle) onto the link surfaces 36 between the link rails 38 of the ramp span 12. This allows him to both freely leave and gain access to the van's interior 28 in a manner that he would be otherwise unable to accomplish without the aid of another individual. Thus, the use of the present invention provides handicapped individuals 20 with a method by which they can gain access to vehicles or other raised areas that would ordinarily require the assistance of others. Additionally, the present invention can also be employed to provide able-bodied individuals with a means by which they can load and unload wheeled vehicles from other transport vehicles that would normally require the assistance of one or more additional people.

The individual ramp links 14 of the present invention are designed in a manner that provides a more than adequate amount of strength to both the ramp links 14 individually and to the ramp span 12 as a whole while retaining features that ensures its overall weight be light enough to allow for its use by people of a wide degree of physical capabilities. The light weight requirement of the present invention is met by the use of strong yet lightweight materials, such as aluminum and/or its related alloys, in it's construction and by the incorporation of a large number of weight reduction holes 34 in its surfaces that have the effect of reducing the total amount of material used in the construction of the present invention. This reduction of construction material has the effect of lessening the overall weight of the present invention without reducing its structural integrity.

The ramp spans 12 can also be equipped with the optional pinch protectors 40 which are removable features that span the areas between the upper most surfaces of the neighboring ramp links 14 and ensure that nothing can become pinched between these surfaces during the deployment operations. The pinch protectors 40 are attached to the ramp links 14 by snapping them to the protruding head of the pivot bolt 56 from where they extend up to form a hood over the joining link rails 38 on neighboring ramp links 14. Additionally, both the foot and link surfaces, 30 and 36, are equipped with a plurality of parallel grip ridges 32 extending from side to side of these surfaces and serve both to strengthen the ramp links 14 and to provide additional traction to the vehicle being loaded or unloaded.

Figure 8:
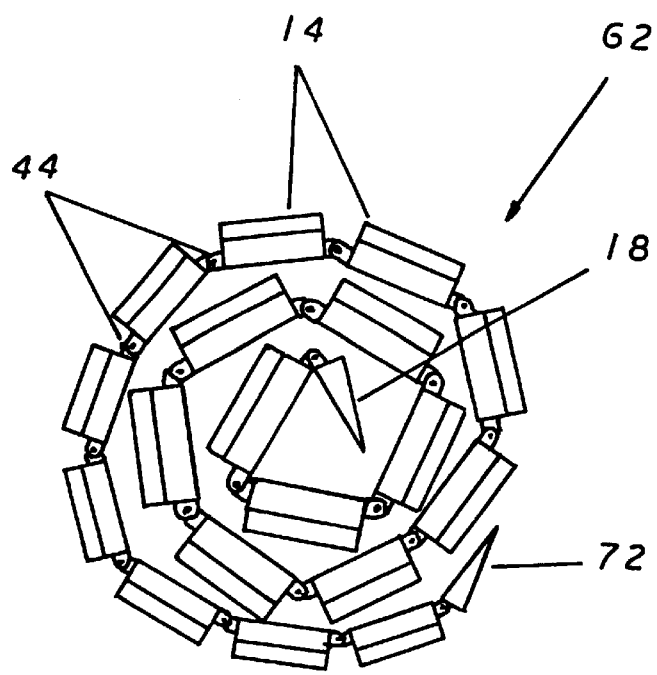
FIG. 8 is a side elevation view of the present invention in its rolled configuration detailing its orientation during storage or transport.

Once the loading or unloading processes is accomplished, the design of the present invention allows it to be rolled up into a compact form that can be easily stored in a relatively small area which is clearly illustrated in FIG. 8. This FIGURE illustrates the manner in which the individual ramp links 14 of the ramp span 12 are rolled around the lower ramp foot 18 in a spiral fashion which terminates at the upper ramp foot 72. The rolled ramp 62 forms a relatively compact structure which can be stored within the van's interior 28 in the position and orientation which interferes the least with the operator's other needs.

The individual ramp links 14 of the present invention are specifically designed in a manner that both facilitates this rolling ability and which provides the structural integrity for the invention to operate as designed and these features are further detailed in FIGS. 3, 4, and 5. Each individual ramp link 14 is composed primarily of the link body 50 which forms the basis upon which the remaining components of the ramp links 14 are built. The link pivot tabs 44 are positioned on the link body 50 on each of its four lowest corners. The two link pivot tabs 44 located on the same side of the ramp link 14 are laterally offset to one direction with reference to the line created by the outside edge of the link body 50 and which is defined by the link rails 38. Conversely, the two link pivot tabs 44 located on the opposite side of the link body 50 are similarly offset but to the opposite direction. This method of construction produces corresponding pairs of link pivot tabs 44 on neighboring ramp links 14 that can be positioned next to each other when joining them to form a ramp span 12. Additionally, each link pivot tab 44 contains a pivot pin hole 52 that passes completely through them. The connection of two neighboring ramp links 14 is completed by passing a link pivot bolt 56 through the pivot pin hole 52. This design allows each of the individual ramp links 14 to pivot in relation to one another around the axis that is formed by the insertion of the link pivot pin 46. This pivoting motion of the individual ramp links 14 is the aspect of the present invention which allows it to be rolled up for storage purposes and also to be unrolled for loading purposes.

As stated above, the link body 50 is also equipped with a plurality of weight reduction holes 34 which function to lessen the overall weight of the present invention without affecting its strength. Additionally, the link body 50 also contains similarly looking holes in its outer vertical surfaces known as the 180° pivot attachment slots 48 which serve the dual purposes of weight reduction and to provide the point of attachment for an alternative hinging apparatus that will be more fully discussed below.

The link body 50 also provides the point at which the link contact surfaces 54 are positioned at the most outside edges of the link rails 38. These link contact surfaces 54 are the components of the present invention that limit the ramp links 14 outward travel during the unrolling process. The link contact surfaces 54 are also designed in a manner that allows them to carry the weight of both the ramp span 12 and any vehicle using it for loading or unloading purposes when the invention is in use. Additionally, the link contact surfaces 54 of each ramp link 14 are flat but formed with a slight inwardly oriented angle of about 1° (in relation to the link surface 36 of the ramp links 14) which interacts with the corresponding link contact surfaces 54 of the neighboring ramp link 14 during the attachment process. This slight angle is important to the function of the present invention as it imparts a slight arch to the ramp span 12 when it is extended for loading and unloading purposes. This arch increases the horizontal strength of the ramp span 12 and allows the present invention to be used in conjunction with relatively heavy loads.

Additionally, the positioning of the pivot pin hole 52 in relation to the link surfaces 36 and the link contact surfaces 54 is important to the overall operation of the present invention. This relationship creates a contact distance (the distance between the center of the pivot pin hole 52 and the link surfaces 36) on the link contact surfaces 54 which are the components of the two neighboring ramp links 14 that come together when the ramp spans 12 are extended for use. The important aspect of the contact distance is that the overall strength of the ramp span 12 is dependant upon this relationship between the pivot pin holes 52 and the link contact surfaces 54. Therefore, the greater the contact distance used on the individual ramp links 14, the greater the strength of the ramp span 12 once it has been unrolled and deployed for use.

Figure 6:
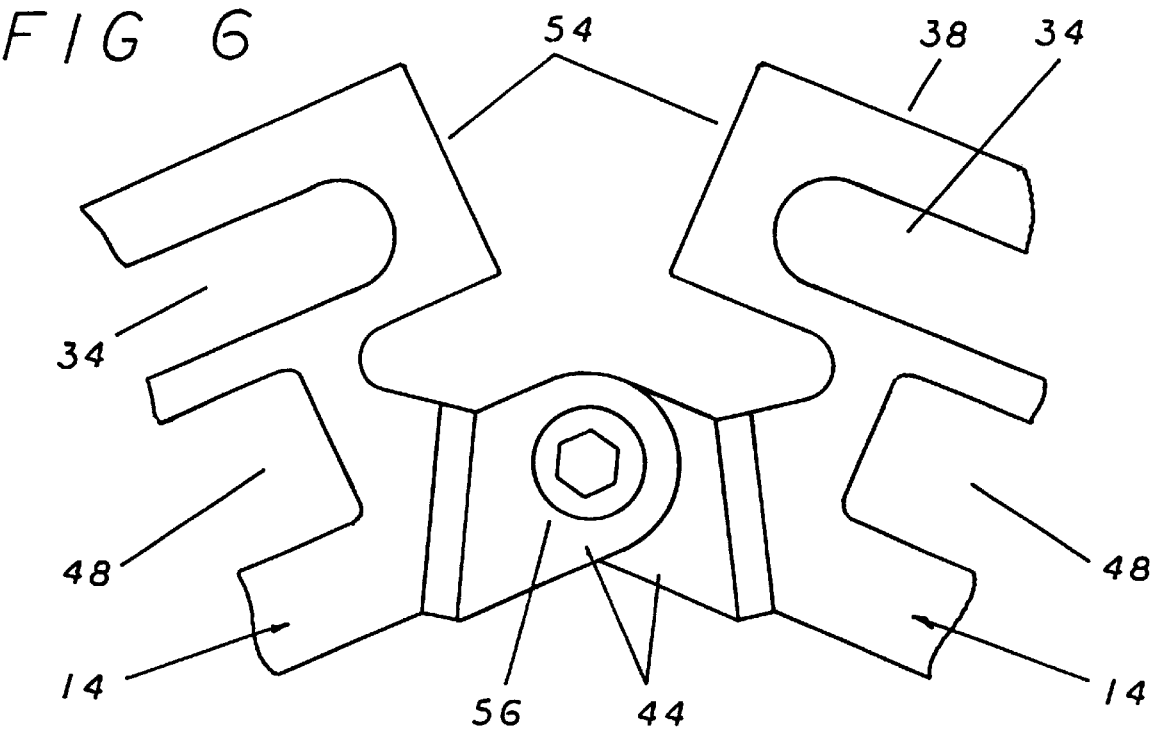
FIG. 6 is a side elevation view of the pivotal connection made between two of the ramp link components of the present invention illustrating the pivotal nature of the connection and the orientation of the related components.
Figure 7:
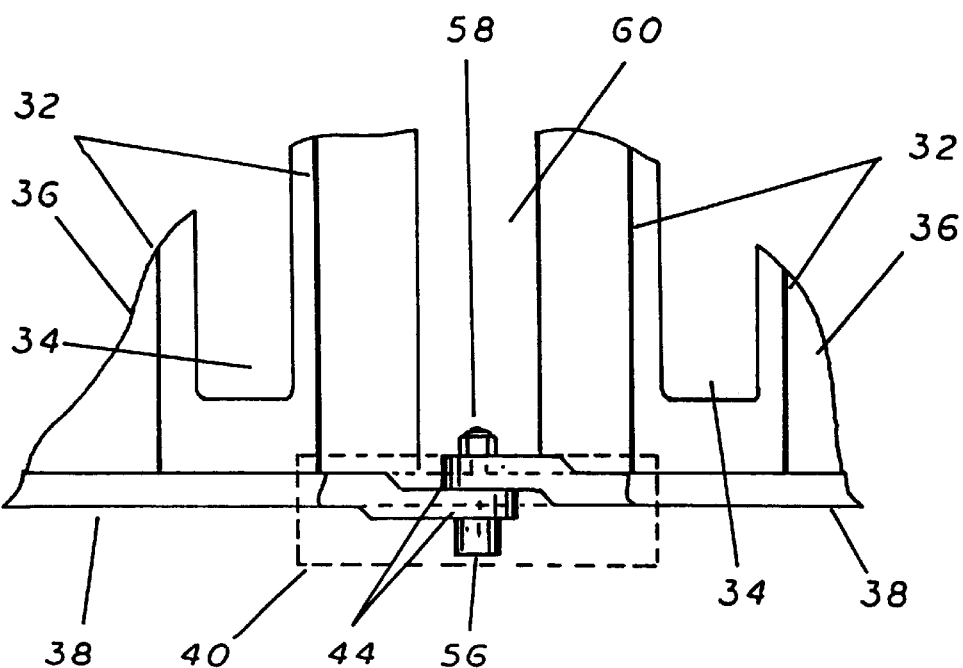
FIG. 7 is a top elevation view of the pivotal connection made between two of the ramp link components of the present invention illustrating the pivotal nature of the connection and the orientation of the related components and detailing the position of the pinch protector.

The function and design of the link pivot tabs 44 and their related components are further detailed in FIGS. 6 and 7 which illustrate the relationship of link pivot tabs 44 on neighboring ramp links 14 and the manner in which they operate to allow the ramp links to pivot in relation to one another. The lateral offset of the link pivot tabs 44 is clearly illustrated and shows how this offset allows them to be joined along a common line. This joining operation is accomplished by passing a pivot bolt 56 through the body of the neighboring link pivot tabs 44 and securing it there by the use of a locking pivot nut 58 being placed on the opposite side. The use of the locking pivot nut 58 allows for the secure attachment at this point in a manner that the connection is loose enough to allow the joined ramp links 14 to pivot freely in relation to one another. This method of connection is pivotal to the function of the present invention as it allows it to be freely rolled and unrolled for its designed functions.

These FIGURES also illustrate the relationship of two neighboring link contact surfaces 54 during the rolling or unrolling processes as well as giving an idea of the distance between the link contact surface and the line created by the pivot bolt that adds strength to the ramp span 12 as described above. Additionally, these FIGURES also illustrate the nature and location of the link gap 60 which is the distance left between the individual link surfaces 36 when the ramp links 14 are unrolled to create a ramp span 12. The link gap 60 functions much like the weight reduction holes 34 to reduce the overall weight of the present invention without impacting its structural integrity. Finally, these FIGURES also further illustrate the positioning of the pinch protector 40 between neighboring ramp links 14.

Figure 9:
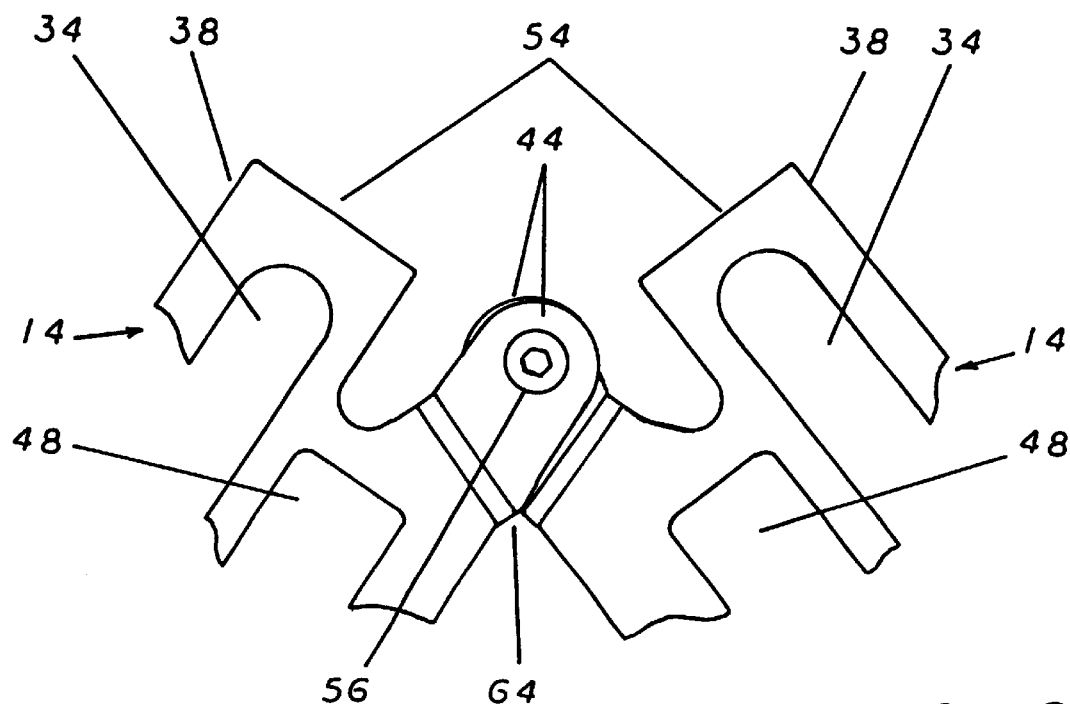
FIG. 9 is a side elevation view of the pivotal connection made between two of the ramp link components of the present invention illustrating the way the connection limits the pivoting travel of the two neighboring links.
Figure 10:
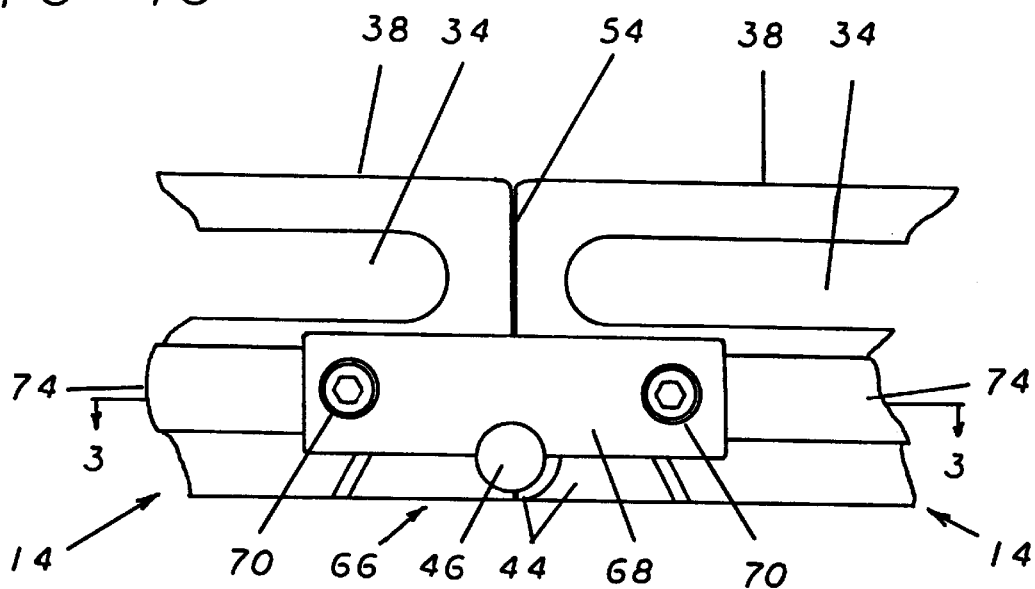
FIG. 10 is a side elevation view of an alternative embodiment of the present invention in which the pivotal attachment between two of its links is made by the use of a 180° hinge which is employed to allow neighboring links to be completely folded back on one another.
Figure 11:
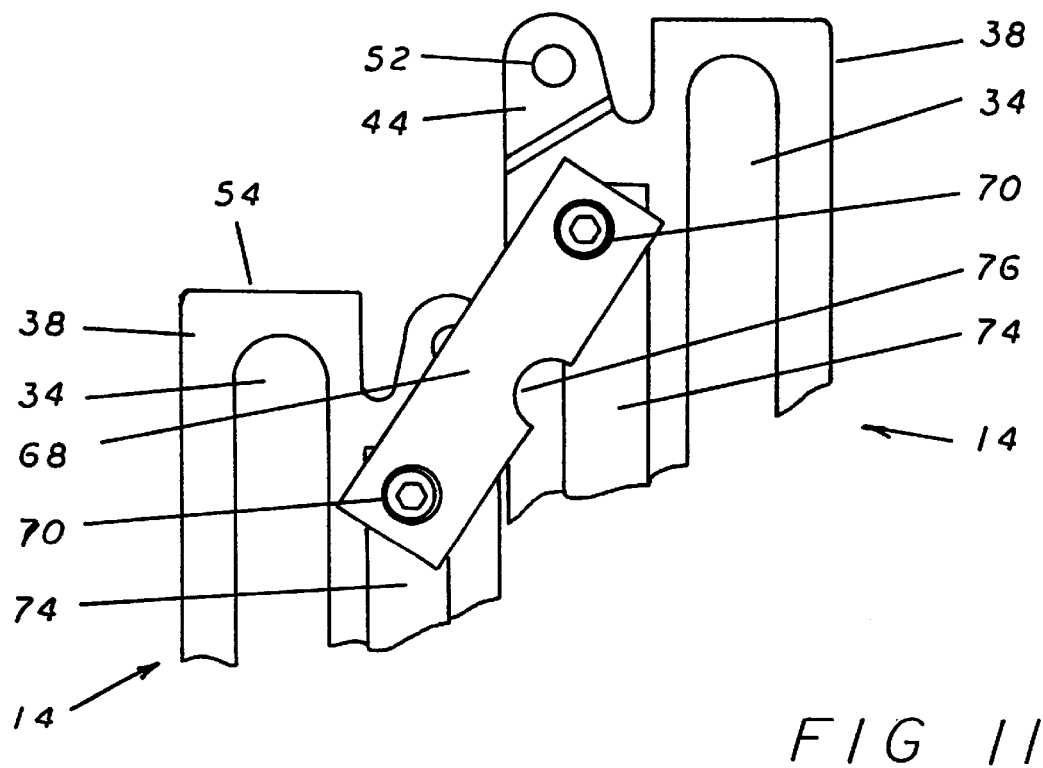
FIG. 11 is a side elevation view of an alternative embodiment of the present invention using the 180° hinge and illustrating the manner in which it allows the links to be completely folded back on one another.
Figure 12:
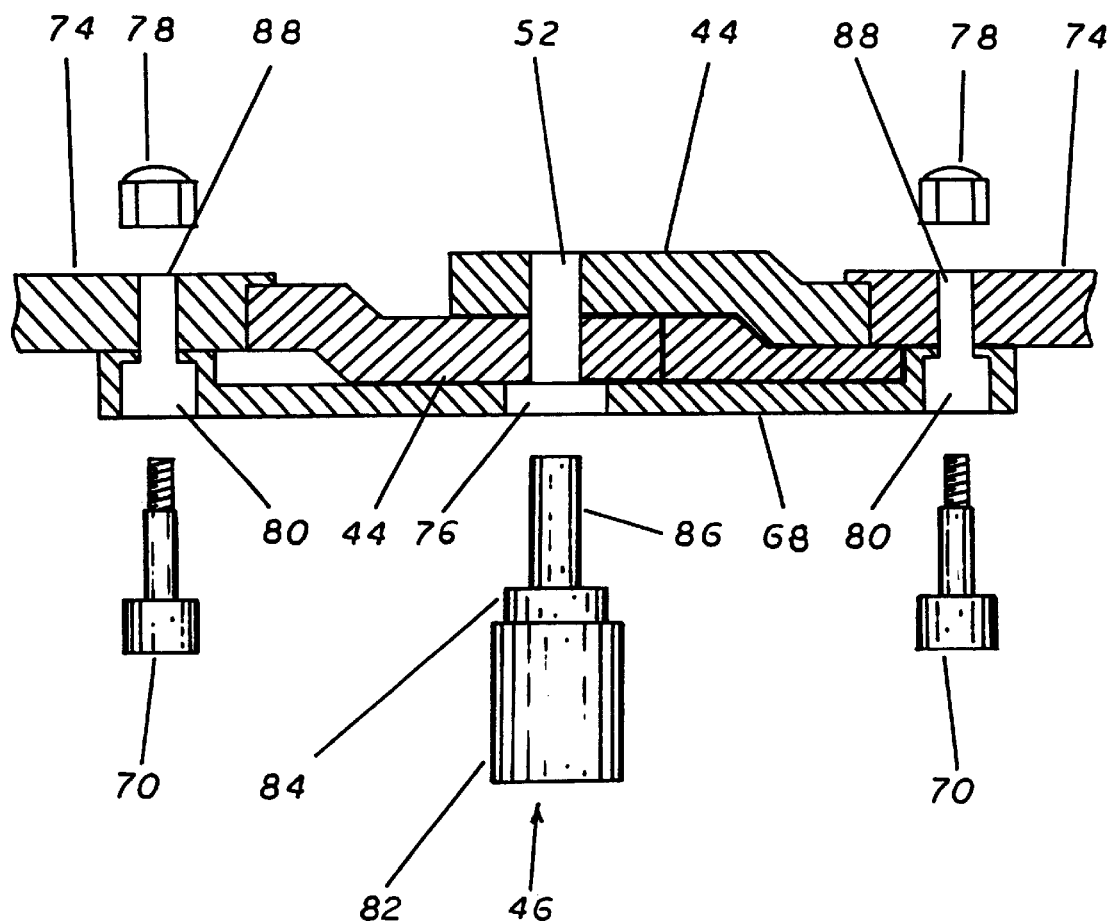
FIG. 12 is a top elevation cut-away view of the alternative embodiment of the present invention using the 180° hinge taken along line 3 of FIG. 10 and details the manner of construction of the 180° hinge and the orientation of its major components.

An alternative embodiment of the present invention is illustrated in FIGS. 10, 11, and 12 which detail the use of the 180° pivot attachment bracket 66 in conjunction with two neighboring ramp links 14. The feature of the previous embodiment of the invention that makes the use of the 180° pivot attachment bracket 66 necessary is illustrated in FIG. 9 which shows how a pivot contact point 64 is created between two joined link pivot tabs 44 when rolling the invention up for storage or transport purposes. The pivot contact point 64 limits the ability of two joined ramp links 14 to be folded in on one another which means that the bottom surfaces of the ramp links 14 could never be folded to a parallel orientation. The use of the 180° pivot attachment bracket 66 allows this folding to be accomplished which gives the present invention the ability to be folded in half for transport or storage. This ability adds a further degree of flexibility to the use of the invention as it provides an alternative configuration for storage or transport that is both easier and which can be accomplished more quickly than the previous embodiment.

The 180° pivot attachment bracket 66 is made up of a pivot bracket 68 which spans the joint between neighboring ramp links 14 and is pivotally connected at each end by the use of the bracket bolts 70 which pivotally fix it to a pivot bracket attachment plate 74 located in the side of the link body 50 of each ramp link 14. The pivot bracket attachment plates 74 are simply specifically designed metallic plates that are designed to slip into the 180° pivot attachment slots 48 in the vertical side of the link body 50 from the inside of the ramp link to a point where their outside surface is flush with the outside surface of the link body 50. The 180° pivot attachment slots 48 are equipped with bracket bolt holes 88 that allow the bracket bolts 70 to pass through to facilitate the attachment of the pivot bracket attachment plate 74. The attachment process is completed by the use of the locking bracket nuts 78 which provide a secure connection between these components while allowing them to pivot freely relative to one another. Additionally, the pivot bracket attachment plate 74 is also equipped with bolt recesses 80 which allow the heads of the bracket bolts 70 to be flush with the outside surface of the pivot bracket attachment plate 74 when fully attached. This design feature allows this embodiment of the present invention to operate seamlessly with components, such as the pinch protectors 40, that were originally designed for the previous embodiment.

When the ramp links 14 are extended to form the ramp span 12, the 180° pivot attachment bracket 66 and the link pivot pin 46, which is composed of a pin body 82, a pin shoulder 84 and a pin shaft 86, allows the ramp span 12 to function as previously described. The purpose of the link pivot pin 46 is to join the link pivot tabs 44 of two neighboring ramp links 14 in the same fashion as described above for the pivot bolt 56. The primary difference is that the link pivot pin 46 is not threaded and does not make use of a nut to secure it in place. Rather, the link pivot pin 46 is held in place by the friction created around it by the connection of the ramp links 14 and the use of the ramp span 12 as the pin shaft 86 fits snugly into the pivot pin holes 52 and the pin shoulder 84 engages the hemispherically shaped bracket pin slot 76 located in the center of the lower surface of the pivot bracket attachment plate 74. Thus, with the link pivot pin 46 in place, the ramp span 12 functions as normal allowing for its use for loading and unloading.

Conversely, the removal of the link pivot pin 46 allows each end of the pivot bracket 68 to pivot freely around its connection to the respective pivot bracket attachment plate 74. This effectively moves the pivot point between the two neighboring ramp links 14 from the single line defined by the location of the pivot pin holes 52, to a pair of pivot points defined by the location of the bracket bolt holes 88. The net effect of this change is that it allows the two neighboring ramp links 14 to be completely folded in upon one another so that their bottom surfaces are completely parallel. The resulting parallel configuration allows a ramp span 12 to be folded in half for storage or transport thereby making the use of the present invention easier when space is not an issue.

Figure 13:
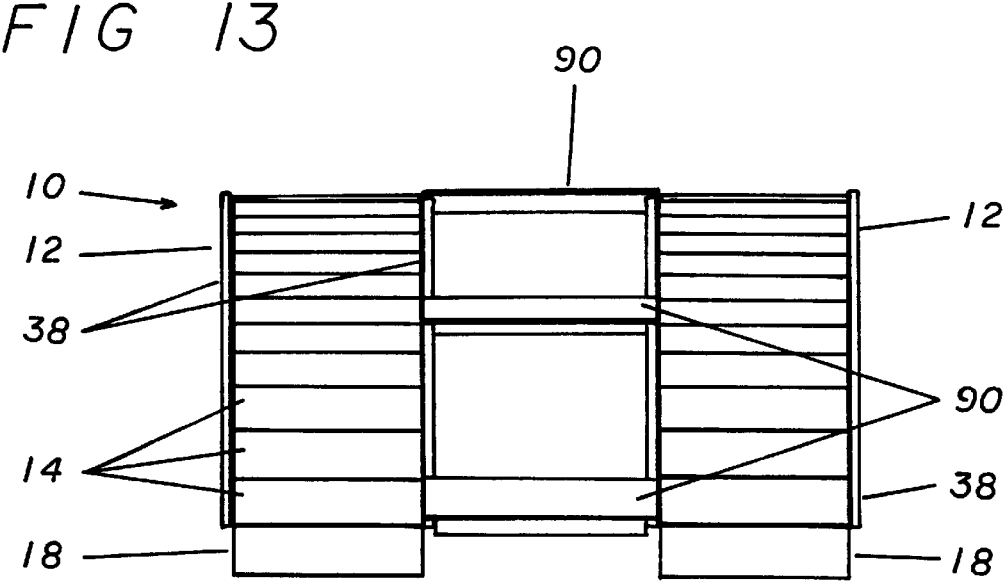
FIG. 13 is a front elevation view of two parallel deployed ramp spans of the present invention illustrating the use of a plurality of cross braces that span the gap between two such ramp spans and serve to both brace the invention as a whole and to stabilize the distance between two parallel ramp spans ensuring that they cannot move between uses.

An optional component of the present invention is illustrated in FIG. 13 and comprises a ramp cross brace 90. The ramp cross brace 90 is a bar-like component made to span the gap between two parallel ramp spans 12 when the roll-up loading ramp 10 is deployed. The ramp cross braces 90 are primarily used to stabilize the orientation of a pair of deployed ramp spans 12 in relation to one another. Additionally, the use of the ramp cross brace 90 has the secondary benefit of strengthening the invention as a whole when it is deployed because it creates a single broader based structure by tying two ramp spans 12 together than one can achieve with two separate ramp spans 12. Therefore, the use of the ramp cross brace 90 provides an additional measure of safety to the use of the present invention due to its strengthening and stabilizing characteristics.

The ramp cross brace 90 is designed in such a manner that allows it to be locked into place on both of its outside edges over the upper surfaces of the link rails 38. To lock two parallel ramp links 14 together, the user simply places the ramp cross brace 90 over the inside link rails 38 of two sequentially identical ramp links 14 on either ramp span 12 and presses down to lock it. Additionally, the user can place any number of the ramp cross braces 90 between the parallel ramp spans 12, the number of which is generally determined by the length of the ramp spans 12 in use, in any location above the lower ramp foot 18. As a result of its design and the ease of installation and removal, the use of the ramp cross brace 90 does not significantly interfere with the overall use of the present invention and its designed purposes.

Figure 14:
FIG. 14 is a front elevation view of an alternative embodiment of the present invention which employs a ramp span that is constructed of individual ramp links of sufficient width to accommodate all of the intended vehicles with a single ramp span.
Figure 15:
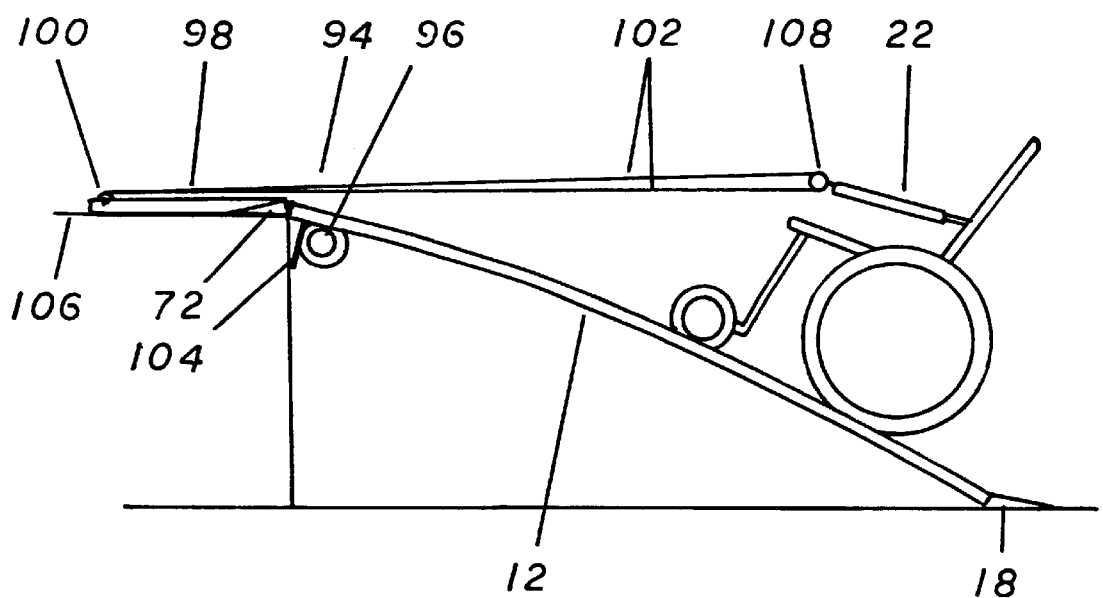
FIG. 15 is a side elevation view of the present invention illustrating it as being equipped with an optional powered chair lift assembly which is used to pull the wheelchair or other supplemental vehicle up the incline of the invention's ramp spans.
Figure 16:
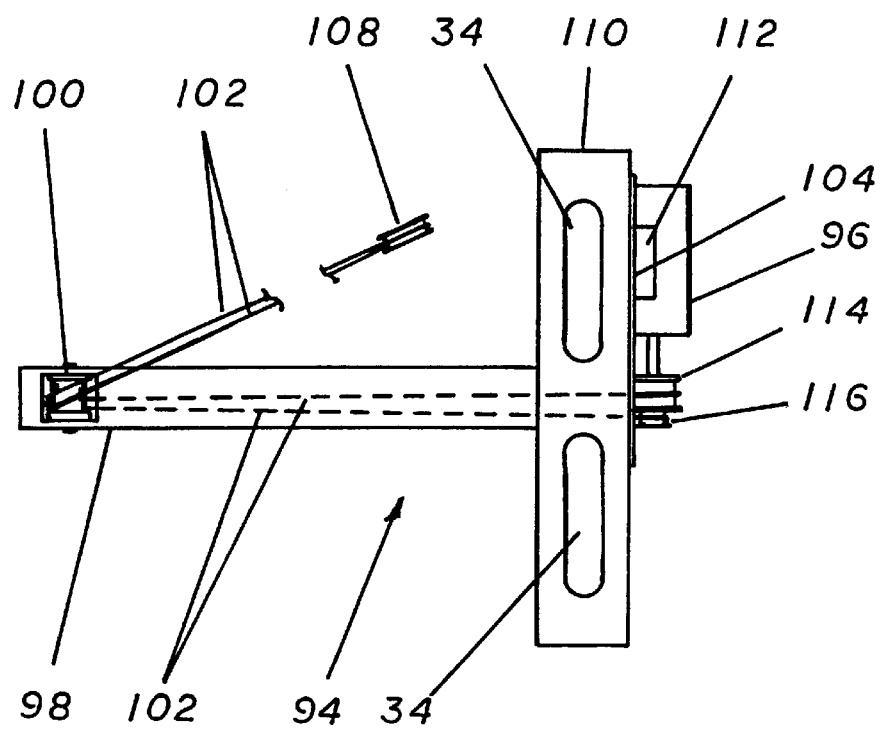
FIG. 16 is a top elevation view of the powered chair lift assembly component of the present invention illustrating the orientation of its major components.
Figure 17:
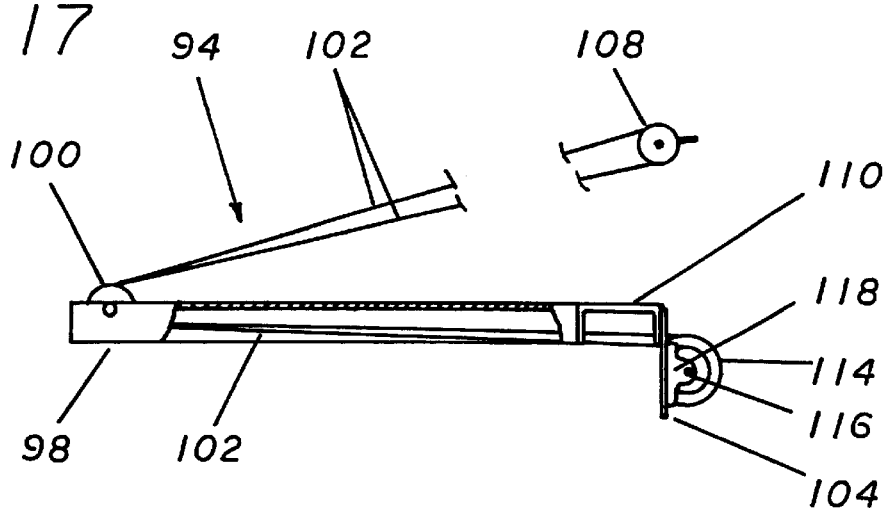
FIG. 17 is a side elevation view of the powered chair lift assembly of FIG. 16 illustrating the manner in which the cable is connected to and operates in conjunction with the remaining relevant components.
Figure 18:
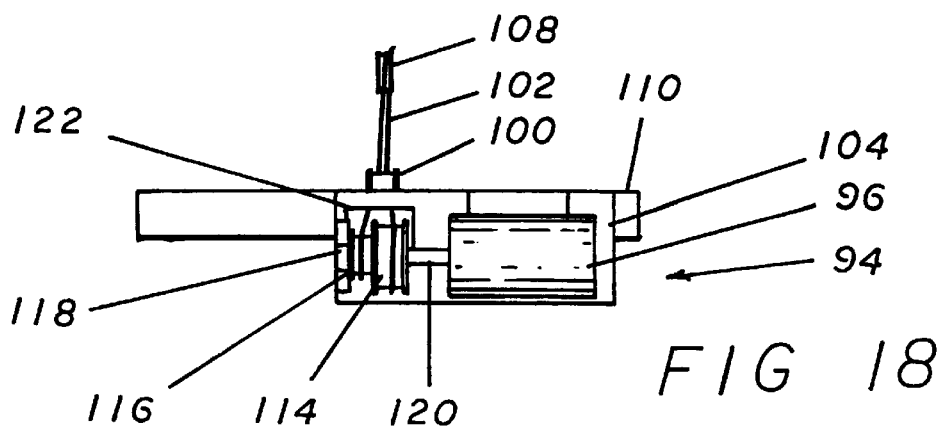
FIG. 18 is a front elevation view of the powered chair lift assembly of FIG. 16 and illustrates the positioning of the electric motor and pulleys in relation to the remaining relevant components.

An alternative embodiment of the present invention is illustrated in FIG. 14 in which a ramp span 12 is constructed by the use of a plurality of wide ramp links 15 and a wide ramp foot 19 resulting in a wide ramp span 92 (the upper end of the wide ramp span 92 must also be fitted with a corresponding wide ramp). The result of the use of the wide ramp links 15 is a single ramp span 12 that is roughly equivalent in its width to the two parallel ramp spans 12 used in the previous embodiment. The use of the wide ramp span 92 creates a more stable incline surface without the need for supplemental bracing devices. However, the addition of material in relation to the previous embodiment means that the wide ramp span 92 is relatively heavy. Due to this characteristic, the wide ramp span is most often used in situations where its weight is not of particular importance such as more permanent installments.

An additional optional component for use with all of the described embodiments of the present invention is illustrated in FIGS. 15, 16, 17, and 18 which detail the manner of construction and operation of a the powered lift assembly 94. The powered lift assembly 94 is used with a deployed ramp span 12 to provide a means by which a wheelchair, or other supplemental vehicle, can be moved up the incline of the invention without requiring the user to do so manually. The use of this component allows certain individuals access to elevated areas without having to get the assistance of additional people.

The powered lift assembly 94 is built on a mount cross brace 110 which is designed in a similar manner as the previously described ramp cross brace 90 that has been specially designed to provide a mounting point of the remaining components of the powered lift assembly 94. In this design, the mount cross brace 110 is designed in such a manner that allows it to be fitted and connected in the same manner as a ramp cross brace 90 between the upper most sections of two parallel ramp spans 12. In the case of the wide ramp span 92, a specialized wide ramp link 15 that will accommodate the inclusion of the powered lift assembly 94 in a manner that does not interfere with the normal operation of the wide ramp span 92. Thus, the mount cross brace 110 has the same features that allow it to connect to the link rails 38 and also the weight saving features such as the weight reduction holes 34 that limit the overall weight of the invention while adding a stabilizing and strengthening factor similar to the ramp cross brace 90.

The mount cross brace 110 has attached to its rearward facing vertical face an assembly mount plate 104 which is the mounting point for the electric motor 96 and its related components. The electric motor 96 itself is attached here by the use of the motor mount bracket 112 which can be manufactured in any number of fashions but is illustrated as a section of angle iron attached on its horizontal surface to the electric motor 96 and on its vertical surface to the motor mount bracket 112. The electric motor 96 has the motor shaft 120 extending outward from its inside edge which engages the large pulley 114 and small pulley 116 which are in turn also attached to the assembly mount plate 104 by the use of the pulley mount 118. The electric motor 96 is used to drive the large and small pulleys, 114 and 116, which in turn control the primary operations of the powered lift assembly 94.

The large and small pulleys, 114 and 116, also serve as the place of attachment for both ends of the cable 102. The cable 102 is the component of the powered lift assembly 94 that transfers the rotational power of the electric motor 96 and the large and small pulleys, 114 and 116, to the lineal force necessary to pull objects up the incline of the ramp span 12. For this purpose, the cable 102 extends forward from the large and small pulleys, 114 and 116, through the cable hole 122 in the assembly mount plate 104. From this point, the two sections of the cable 102 extend forward to the point where they engage and encircle the idler pulley 100 which in turn redirects the cable 102 back down the ramp spans 12 where it terminates at the chair attachment 108.

The forward face of the mount cross brace 110 has extending forward the idler pulley extension 98. The idler pulley extension 98 serves to provide a mounting point for the idler pulley 100 and extends forward from the terminus of the ramp span 12 along the landing surface 106 which is either the floor of the van 16 or the floor of the building that the user is employing the invention to gain access to. The idler pulley is rotationally mounted at a point within the end of the idler pulley extension 98.

This placement of the idler pulley 100 forward on the landing surface 106 accomplishes two purposes that are central to the operation of the powered lift assembly 94. The first of these is to place the point of draw for the cable 102 far enough forward in relation to the ramp spans 12 so that it can pull the wheelchair fully onto the landing surface 106 so that the wheelchair 22, or other supplemental vehicle, can be disconnected with its wheels firmly on the landing surface 106, thereby eliminating the danger of it rolling back down the ramp spans 12. Additionally, the placement of the idler pulley 100 also enhances the overall leverage of the system which increases the performance of the powered lift assembly 94.

Figure 19:
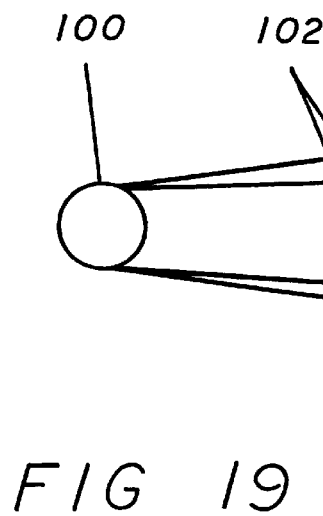
FIG. 19 is a side elevation view of the cable and pulley components of the powered lift assembly of FIG. 16 and which illustrates their general relationship and the manner in which they function to provide the desired operation.

The major operational components and their method of operation are further detailed in FIG. 19 which illustrates the manner in which the cable 102 interacts with the large and small pulleys, 114 and 116, the idler pulley 100, and the chair attachment 108. As previously stated, either end of the cable 102 is attached to the large and small pulley, 114 and 116, respectively. This forms a loop of the cable 102 which extends over the idler pulley 100 and around the chair attachment 108. When the large and small pulley, 114 and 116, are rotationally driven in a clockwise manner, each end of the cable 102 is wrapped around its respective pulley. This has the effect of shortening the loop in the cable 102 which in turn draws the chair attachment 108 towards the idler pulley 100. Thus, a clockwise rotation of the large and small pulleys, 114 and 116, operates to pull anything connected to the chair attachment 108 up the incline of the ramp spans 12. Conversely, a counter clockwise rotation of the large and small pulleys, 114 and 116, will unwrap the cable 102 which in turn lengthens the loop and allows the chair attachment 108 to retreat from the idler pulley 100. This allows for the controlled lowering of vehicles down the ramp spans 12 and for the positioning of the chair attachment for future use.

Figure 20:
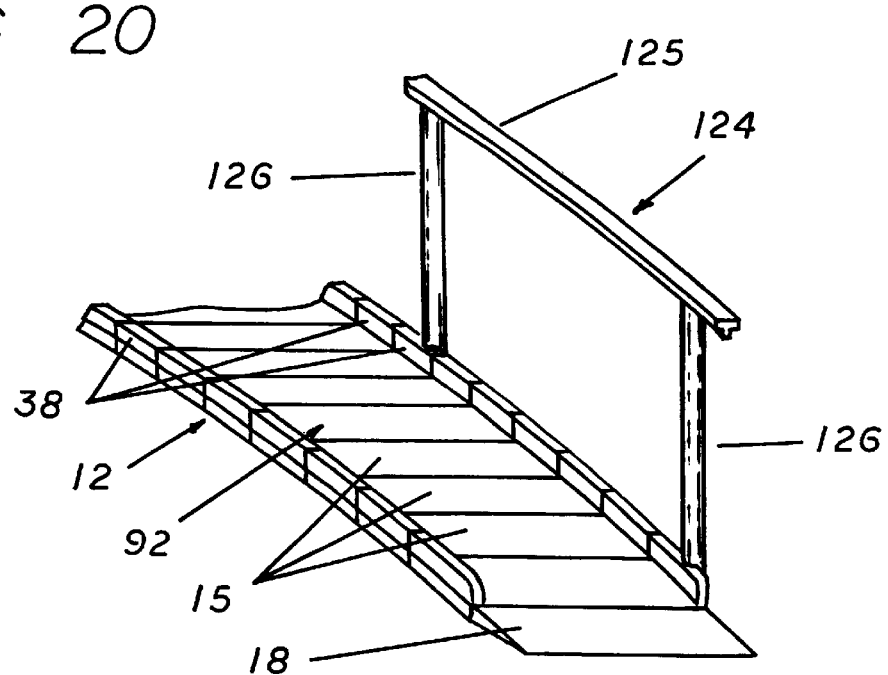
FIG. 20 is a perspective view of the present invention as equipped with an optional component in which the ramp span is fitted with an elevated hand rail used to provide an extra degree of stability to the invention's users.

An additional optional component for use with the present invention is illustrated in FIG. 20 which illustrates the use of a ramp hand rail 124 in conjunction with a ramp span 12 of the present invention (for illustrative purposes FIG. 20 illustrates the use of the ramp hand rail 124 with the wide ramp 92 of FIG. 14 and being attached to the link rails 38 of the wide ramp links 15 and wide ramp foot 19. However, the ramp hand rail 124 is capable of being fixed in the same manner to the narrower ramp links 14 used in the primary embodiment of the present invention). The use of the ramp hand rail 124 provides an extra degree of stability to those individuals require hand support on inclined surfaces.

The ramp hand rail 124 is made up of the hand rail 125 which extends the length of the ramp span 12 in a vertically extended position at an appropriate height above the upper surface of the wide ramp links 15. The suspension of the hand rail 125 at the correct height is accomplished through the use of a plurality of hand rail posts 126 which are generally evenly spaced down the length of the ramp span 12 and the hand rail 125. The hand rail posts 126 are generally made up of cylindrical metallic posts (or any other suitable combination of material and form) which are configured on their lower ends in such a manner so that their profile exactly mirrors the shape of the outer surface of the link body 50. This design allows the hand rail posts 126 to fit tightly over the link rails 38 of the ramp links 14 of the present invention.

Figure 21:
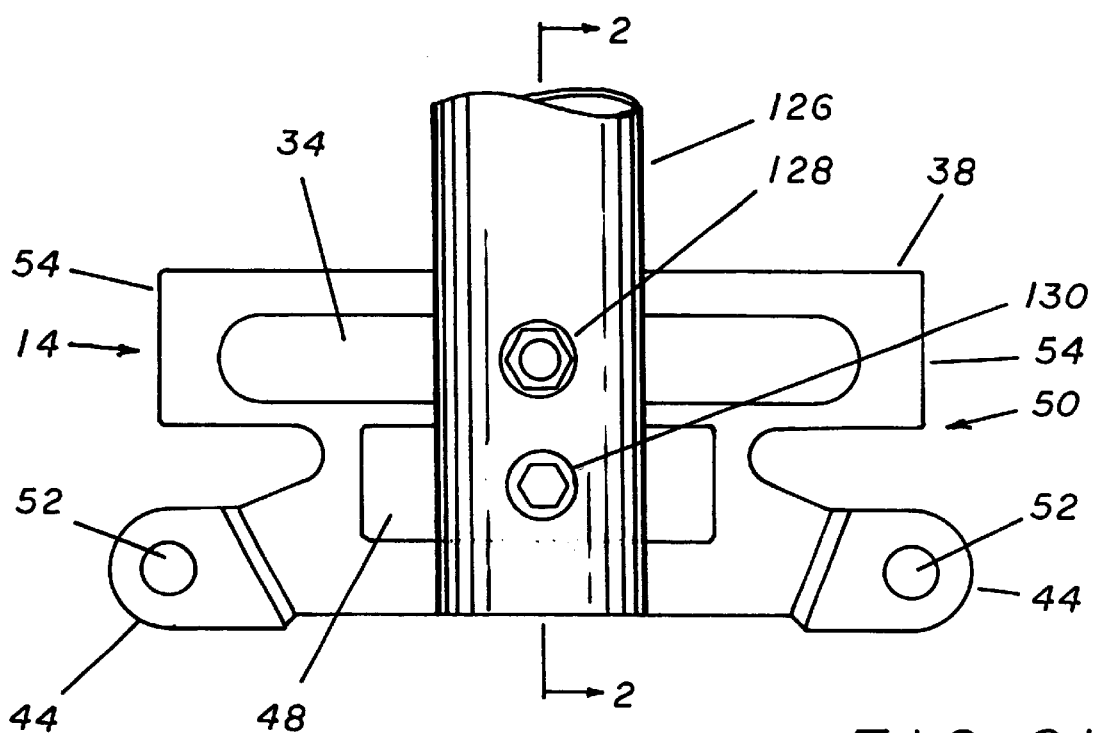
FIG. 21 is a side elevation view of the lower mount component of the optional hand rail component of FIG. 20 and illustrates the method used to connect the hand rail posts to the ramp span.
Figure 22:
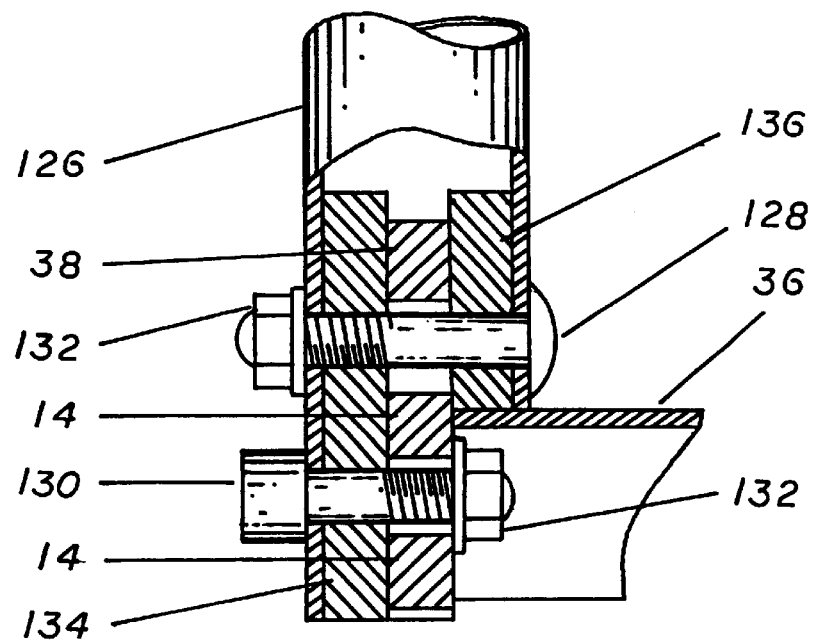
FIG. 22 is a front elevation cut-away view of the lower mount component of the optional hand rail component of FIG. 20 taken along line 2 and illustrates the method used to connect the lower portion of the hand rail post to the rail body of a ramp link.
Figure 23:
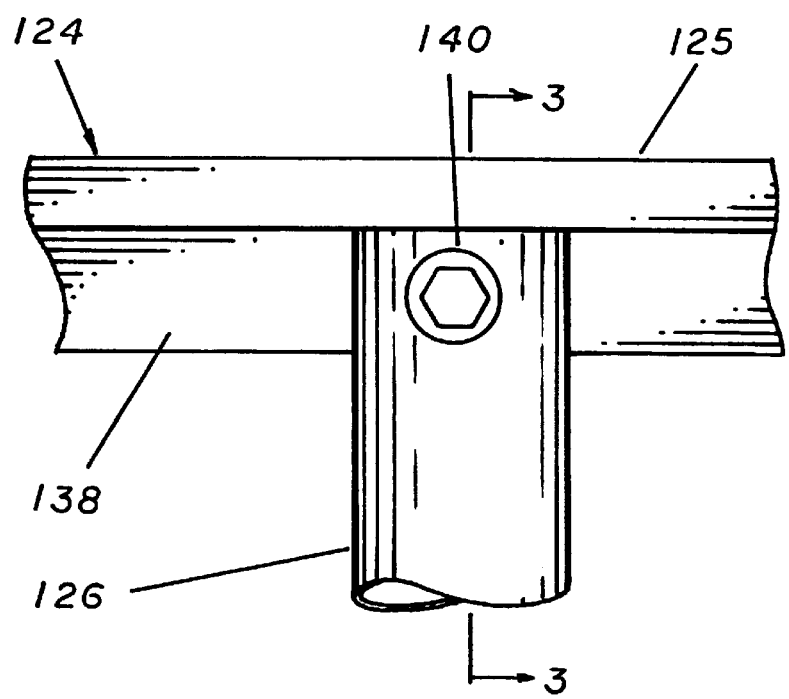
FIG. 23 is a side elevation view of the upper mount component of the optional hand rail component of FIG. 20 and illustrates the method used to attach the upper end of the hand rail post to the hand rail.

The manner in which the connection between the hand rail posts 126 and the link rails 38 is further illustrated in FIGS. 21 and 22. The attachment is made by the use of the upper and lower mount bolts, 128 and 130, which pass from the outside of the lower portion of the hand rail posts 126, through their interior, then through weight reduction holes 34 in the link rails 38 and the 180° pivot attachment slot 48 of the link body 50 respectively. After the upper and lower mount bolts, 128 and 130, have been positioned correctly, they are secured in place by the use of the bolt nuts 132. Additionally, the gap in the interior of the hand rail posts 126 created by the cylindrical configuration of the hand rail posts 126 and the flat configuration of the link body 50 is compensated for by the insertion of the outer lower mount spacer 134 and the inner lower mount spacer 136. The outer lower mount spacer 134 fills in the gap between the inner wall of the hand rail posts 126 and the outer walls of the link rails 38 and the link body 50. Conversely, the inner lower mount spacer 136 fills in the gap between the inner wall of the hand rail posts 126 and the inner surface of the link rail 38. The use of the outer and inner lower mount spacers, 134 and 136, ensures that the connection between the hand rail posts 126 and the ramp links 14 is solid with no play between the components. This is an important feature of the ramp hand rail 124 as it is necessary to provide a stable base if the hand rail 125 is to provide the extra measure of safety that it is designed for.

The upper portion of the hand rail posts 126 is connected to the hand rail T-body 138 in a similar fashion. The hand rail T-body 138 is a rectangularly shaped ridge that protrudes from the lower surface of the hand rail 125. The connection between the upper portion of the hand rail posts 126 to the hand rail T-body 138 is facilitated by its slotted design to mirror the shape of the hand rail T-body and the hand rail mount bolt 140 which passes from the outside of the upper portion of the hand rail posts 126, through their interior, then through the hand rail inner and outer spacers, 142 and 144, and the body of the hand rail T-body 138, and finally out the other side of the hand rail posts 126. As with the outer and inner lower mount spacers, 134 and 136, the hand rail inner and outer spacers, 142 and 144, ensure a solid connection at the junction of the hand rail 125 and the hand rail posts 126. After the hand rail mount bolt 140 has been thus positioned, it is secured in place by the use of a bolt nut 132. This design fixes the hand rail 125 in the desired position along the top of the plurality of hand rail posts 126 which provides the desired additional hand support structure for users of the present-invention who require extra support while negotiating inclined surfaces.

Figure 26:
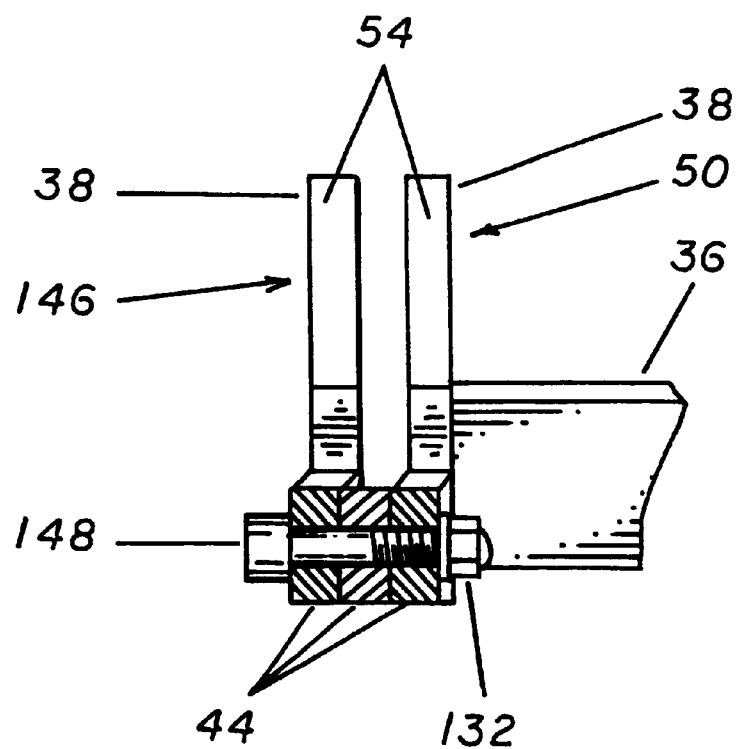
FIG. 26 is a front elevation view of the optional component of the invention detailed in FIG. 25 which illustrates the manner in which the double end plate arrangement is attached to the outside edges of the ramp links of the invention.

A still further optional component for the present invention is illustrated in FIGS. 25 and 26 which detail the use of a double end plate 146 which can be added to outside surfaces of existing ramp links 14 to strengthen the load carrying capacity of ramp spans 12. The double end plate 146 is simply a reproduction of the outer surface of the link body 50 containing all of its components such as the weight reduction holes 34, the link rails 38, the link pivot tabs 44, the 180° pivot attachment slot 48, and the pivot pin holes 52. This design of the double end plate 146 allows a plurality of them to be easily fixed to the outer surface of the link body 50 on an existing ramp span 12. This attachment is accomplished by removing the existing link pivot pin 46 and placing the double end plate 146 over the outer surface of the link body 50 in such a manner so that link pivot tabs 44 and the pivot pin holes 52 exactly line up with one another. Once this step has been accomplished, the link pivot tabs 44 used to tie the ramp links 14 of the original ramp span 12 together are replaced by a plurality of long pivot pins 148 that are long enough to pass through the multiple layers of link pivot tabs 44.

This method of attachment for the double end plate 146 allows the user to selectively place additional support on specific areas of a ramp span 12 to increase its load carrying capacity. This is an important feature of this option as it provides a mechanism by which the weakest portion of the ramp span 12, its center, can be strengthened without affecting the roll-up capability of the present invention or without significantly increasing its weight. The strengthening or the ramp span 12 provides a greater degree of flexibility to the use of the present invention as it allows for the implantation of longer ramp spans 12 or for existing ones to carry a greater load.

Although the present invention has been described in considerable detail with reference to certain preferred versions thereof, other versions are possible. Therefore, the spirit and scope of the appended claims should not be limited to the description of the preferred versions contained herein.

What is claimed is:

1. A loading ramp made up of a plurality of substantially rectangular links, said ramp device formed such that said plurality of rectangular links may be placed in a substantially circular coil, each of said rectangular links comprising:

a link body having a rectangular link surface said link surface having an upper link surface and a lower link surface, a left and a right outer edge and a front and rear outer edge;

said link body further having a left and right link rail attached perpendicularly to said rectangular link surface along said left and right outer edges respectively;

a left and right front pivot tab on said left and right link rail respectively and a left and right rear pivot tab on said left and right link rail respectively said pivot tabs positioned on said link rails below said lower surface of said rectangular link surface, said left and right front pivot tabs being laterally offset in the same first direction in reference to said link rails, said left and right rear pivot tabs being laterally offset in the same second direction in reference to said link rails and said second direction being the opposite direction of said first direction; and said left and right front pivot tabs extending forward of said front edge of said rectangular surface and said left and right rear pivot tabs extending rearward of said rear edge of said rectangular surface.

2. A loading ramp as in claim 1 wherein each of said pivot tabs further comprises a pivot pin hole formed by said pivot tab.

3. A loading ramp as in claim 2 wherein said plurality of rectangular links are joined by attaching the left and right front pivot tabs extending forward of a rectangular link surface to the left and right rear pivot tabs of the of a rectangular links surface extending rearward of said rectangular links rear edge with a plurality of pivot pins such that each of said rectangular links my pivot with respect to the other rectangular links and form an elongate loading ramp with a first and second end.

4. A loading ramp as in claim 3 further comprising a contact surface on each link rail such that the degree of pivot with respect to an adjacent link rail is limited by said contact surface contacting the contact surface of said adjacent link rail.

5. A loading ramp as in claim 4 further comprising a first and second ramp foot said ramp feet being substantially wedge shaped such that when said first and second ramp feet are attached to said first and second ends of said elongate ramp they form a first and second tapered end to said elongate ramp.

6. A loading ramp as in claim 5 further comprising a left and right pivot bracket attached to the left and right side respectively of adjacent link bodies such that said link pivot pins may be removed allowing adjacent links to pivot lower link surface to lower link surface.

7. A loading ramp as in claim 6 further comprising a pinch protector attached to each pivot pin said pinch protector extending upward so as to cover each of said contact surfaces.

8. A loading ramp as in claim 7 further comprising a ramp hand rail attached to said elongate ramp.

9. A loading ramp as in claim 8 further comprising a powered lift assembly attached to said elongate loading ramp said lift assembly having motor and cable assembly so that said cable assembly may be wound by said motor so as to drag an object up said elongate loading ramp.

10. A loading ramp made up of a plurality of substantially rectangular links, said ramp device formed such that said plurality of rectangular links may be placed in various shapes for storage, each of said rectangular links comprising:

a link body having a rectangular link surface said link surface having an upper link surface and a lower link surface, a left and a right outer edge and a front and rear outer edge;

said link body further having a left and right link rail fixedly attached perpendicularly to said rectangular link surface along said left and right outer edges respectively such that said left and right link rail extends above and below said rectangular link surface;

a front and rear contact surface on each link rail above said rectangular link surface;

a left and right front pivot tab on said left and right link rail respectively and a left and right rear pivot tab on said left and right link rail respectively said pivot tabs positioned on said link rails below said lower surface of said rectangular link surface, said left and right front pivot tabs being laterally offset in the same first direction in reference to said link rails, said left and right rear pivot tabs being laterally offset in the same second direction in reference to said link rails and said second direction being the opposite direction of said first direction;

said left and right front pivot tabs extending forward of said front edge of said rectangular surface and said left and right rear pivot tabs extending rearward of said rear edge of said rectangular surface; and a pivot pin hole formed by each of said pivot tabs.

11. A loading ramp as in claim 10 wherein said plurality of rectangular links are joined by attaching the left and right front pivot tabs extending forward of a rectangular link surface to the left and right rear pivot tabs of the of a rectangular links surface extending rearward of said rectangular links rear edge with a plurality of pivot pins such that each of said rectangular links my pivot with respect to the other rectangular links and form an elongate loading ramp with a first and second end.

12. A loading ramp as in claim 11 further comprising a contact surface on each link rail such that the degree of pivot with respect to an adjacent link rail is limited by said contact surface contacting the contact surface of said adjacent link rail.

13. A loading ramp as in claim 12 further comprising a first and second ramp foot said ramp feet being substantially wedge shaped such that when said first and second ramp feet are attached to said first and second ends of said elongate ramp they form a first and second tapered end to said elongate ramp.

14. A loading ramp as in claim 13 wherein said ramp may be rolled into a coil shape for storage.

15. A loading ramp as in claim 14 further comprising a left and right pivot bracket attached to the left and right side respectively of adjacent link bodies such that said link pivot pins may be removed allowing adjacent links to pivot lower link surface to lower link surface.

16. A loading ramp as in claim 15 further comprising a pinch protector attached to each pivot pin said pinch protector extending upward so as to cover each of said contact surfaces.

17. A loading ramp as in claim 16 further comprising a ramp hand rail attached to said elongate ramp.

18. A loading ramp as in claim 16 further comprising a powered lift assembly attached to said elongate loading ramp said lift assembly having motor and cable assembly so that said cable assembly may be wound by said motor so as to drag an object up said elongate loading ramp.

* * * * *